United States Patent
Kumpulainen

[19]

[11] Patent Number: 6,113,676
[45] Date of Patent: Sep. 5, 2000

[54] DEAERATOR FOR USE IN LUBRICATION SYSTEMS

[75] Inventor: Olavi Kumpulainen, Joutseno, Finland

[73] Assignee: Oy Hydrox-Pipeline Ltd., Joutseno, Finland

[21] Appl. No.: 09/155,217

[22] PCT Filed: Apr. 8, 1997

[86] PCT No.: PCT/FI97/00214

§ 371 Date: Sep. 24, 1998

§ 102(e) Date: Sep. 24, 1998

[87] PCT Pub. No.: WO97/38259

PCT Pub. Date: Oct. 16, 1997

[30] Foreign Application Priority Data

Apr. 9, 1996 [FI] Finland ................................. 961556

[51] Int. Cl.$^7$ .................................................. B01D 19/00
[52] U.S. Cl. .............................. 96/193; 95/147; 210/188
[58] Field of Search .......................... 96/193; 95/243, 95/247, 266; 210/188

[56] References Cited

U.S. PATENT DOCUMENTS

| | | | |
|---|---|---|---|
| 2,339,369 | 1/1944 | Baker ........................................ | 96/193 |
| 2,725,956 | 12/1955 | Cunningham ............................. | 96/187 |
| 3,339,346 | 9/1967 | Buchanan .................................. | 55/356 |
| 3,538,682 | 11/1970 | Chattin et al. ............................ | 96/193 |
| 3,561,193 | 2/1971 | Baranowski ............................... | 95/266 |
| 4,010,012 | 3/1977 | Griffin, III et al. ....................... | 96/193 |
| 4,341,534 | 7/1982 | Burger ...................................... | 95/266 |
| 4,345,920 | 8/1982 | Ross ......................................... | 95/266 |
| 4,456,172 | 6/1984 | Roffelsen ................................. | 96/193 |
| 4,696,684 | 9/1987 | Shen ......................................... | 96/193 |
| 4,880,449 | 11/1989 | Babyak ..................................... | 96/193 |
| 5,009,680 | 4/1991 | Brekke ...................................... | 96/193 |
| 5,039,425 | 8/1991 | Caris et al. ............................... | 95/261 |
| 5,314,613 | 5/1994 | Russo ....................................... | 95/266 |
| 5,858,070 | 1/1999 | Halm et al. ............................... | 95/248 |

FOREIGN PATENT DOCUMENTS

| | | | |
|---|---|---|---|
| 452 181 | 10/1991 | European Pat. Off. . | |
| 284403 | 5/1915 | Germany ................................. | 95/247 |
| 1038847 | 8/1953 | Germany . | |

Primary Examiner—Duane S. Smith
Attorney, Agent, or Firm—Andrus, Sceales, Starke & Sawall, LLP

[57] ABSTRACT

Deaerator for the treatment of oil returning from an oil circulating lubrication system before the oil returns into the oil tank (1), said deareator including an inlet container (2) acting as an air lock, in which the oil level is higher than the oil level in the oil tank (1) and into which the oil to be purified flows via a return pipe (3); a separating container (4) placed above the inlet container, with a rising pipe (5) leading from the inlet container into the separating container, an outlet pipe (6) for passing the oil from the separating container (4) into the oil tank (1), and a suction connection (7) in the upper part of the separating container (4) for the application of negative pressure in the separating container and for the removal of the separated air from the separating container.

10 Claims, 1 Drawing Sheet

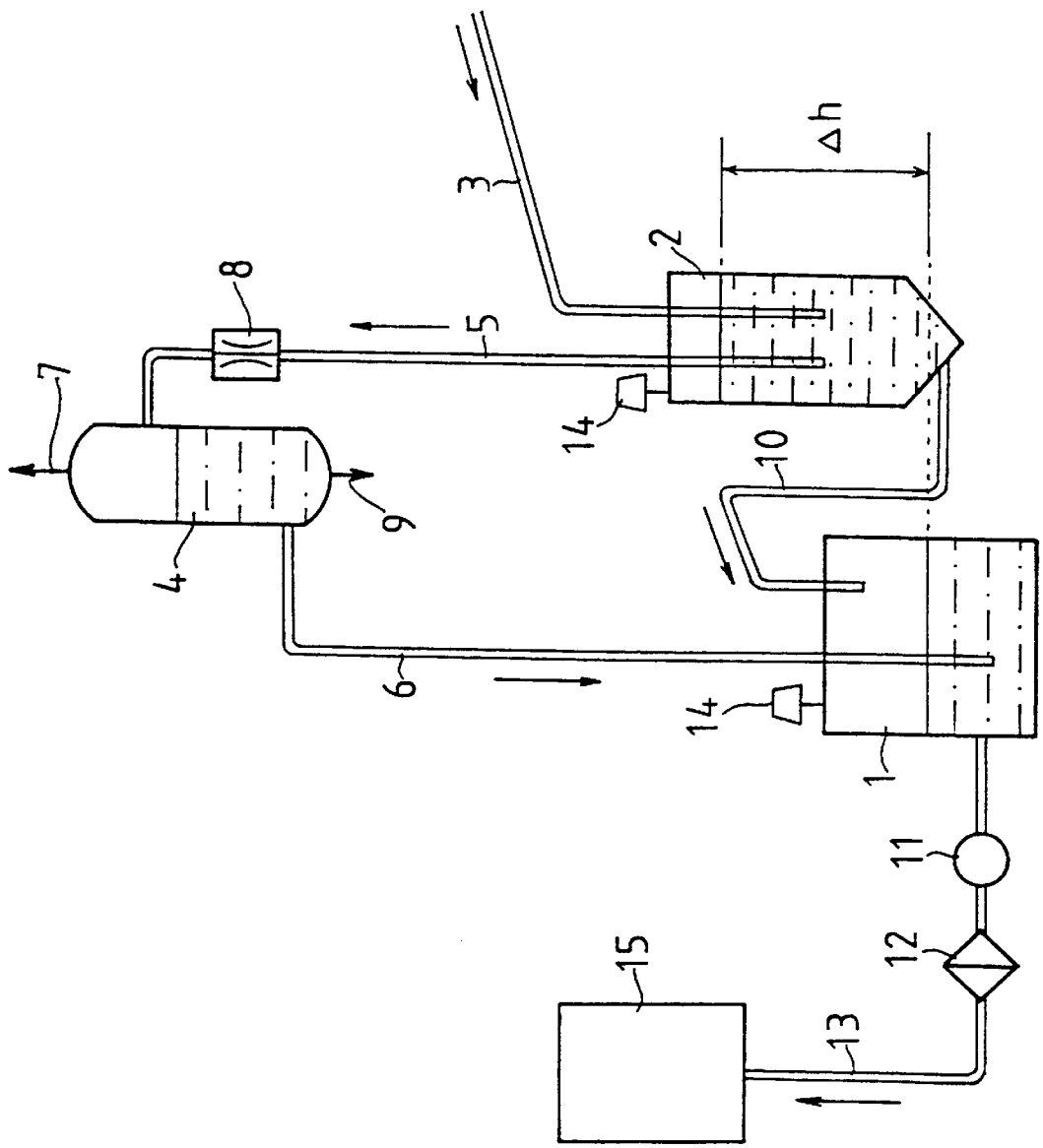

DEAERATOR FOR USE IN LUBRICATION SYSTEMS

BACKGROUND OF THE INVENTION

The present invention relates to a deaerator designed for use in oil circulating lubrication systems.

The deaerator of the invention has been specially developed for the oil circulating lubrication system of a paper machine, but it can also be used in other areas of process engineering and in large assemblies of equipment employing oil circulating lubrication systems.

In the oil circulating lubrication systems of paper machines, some air is always mixed with the oil. Air bubbles in the oil impair its lubricating properties and e.g. prevent high-speed operation of paper machines.

A prior-art attempt to eliminate the problems resulting form the presence of air bubbles in the oil is to increase the amount of oil in the system by using a larger oil tank. This is based on the expectation that, as the oil stays longer in the tank, the air bubbles will have enough time to rise to the surface and get out of the oil before it returns to the lubrication circulation.

There are also various flow guides used in oil tanks to keep the oil longer in the tank and to allow more effective separation of air bubbles. However, by monitoring the oil flow and taking samples of incoming and outgoing oil, it has been found that usually only about 20% of the oil is moving in the tank. In other words, most of the oil in a large tank remains stationary and the incoming oil flows almost directly through the tank back to circulation without undergoing any notable purification or separation of air in the tank. The same fact has also been discovered in investigations, in which it has been established that the incoming oil and the outgoing oil contain practically equal amounts of air and other impurities.

To eliminate the problems described above, an apparatus according to patent specification DE 1038847 has been used. However, the apparatus presented in this specification is very complex and requires several power means for operation, and in addition it suffers from the significant problem described above, in other words, air is not separated in the large tank in the desired manner but only part of the oil flows along the path built through the tank while most of the oil remains stationary in the tank.

SUMMARY OF THE INVENTION

The object of the present invention is to eliminate the drawbacks mentioned above. A specific object of the invention is to produce a new type of deaerator which allows effective separation of air from the oil before the oil tank and which is as simple in structure as possible as well as reliable in operation.

The deaerator of the invention comprises an inlet container, which acts as an air lock and into which the oil to be purified flows through a return pipe. The inlet container is so disposed in relation to the main oil tank of the oil circulating lubrication system that the oil level in it is always higher than the oil level in the main oil tank. Moreover, the deaerator comprises a separating container placed substantially higher than the inlet container, with a vertical rising pipe leading from the inlet container into the separating container. From the separating container, the oil is passed via a substantially vertical outlet pipe into the oil tank. Moreover, the separating container is provided with a suction connection to create a negative pressure in the separating container and to remove the separated air from the separating container. Thus, when a sufficient negative pressure prevails in the separating container, the oil will flow freely by gravitation through the deaerator without having to be pumped and without its flow or movement having to be promoted in any other way.

The rate of oil flow through the deaerator is naturally mainly determined by the pipe diameters, but preferably the rising pipe is provided with an adjustable check valve or a corresponding element to allow the oil flow rate in the rising pipe to be adjusted.

Since the oil stays in the separating container for some time, it is possible that different impurities, sediment and rubbish will be accumulated on the bottom of the separating container. Therefore, the lower part of the separating container is provided with a discharge connection, through which such impurities can be removed.

The oil flowing into the inlet container may contain a relatively large amount of air bubbles and, on the other hand, sometimes the oil flowing into it may also be relatively free of air. Since the oil stays in the inlet container for some time, some deposition of oil already occurs in this container, so that the cleanest oil sinks down while oil containing plenty of air bubbles rises up. Therefore, in a preferred embodiment of the invention, the deaerator is provided with a connecting pipe leading from the lower part of the inlet container directly into the oil tank, so that part of the oil, i.e. the cleanest oil gathered in the lower part of the inlet container, can be passed directly past the separating container into the oil tank. This connecting pipe may be provided with a valve to allow adjustment of the flow. The connecting pipe can also preferably be used as a by-pass pipe for the entire oil quantity when the deaerator is being serviced or is out of use for other reasons.

In a preferred embodiment, the connecting pipe acting as a by-pass pipe allows free flow and functions as a flow adjuster. In this case, even if the flow in the oil inlet pipe varies, the flow passing through the separating container is constant, because changes in the flow are discharged directly through the connecting pipe into the oil tank. In this way, stable and uniform conditions for the deaeration process and a maximum deaeration efficiency are achieved.

In the deaerator of the invention, both the end of the return pipe and the end of the rising pipe are below the oil level in the inlet container, and similarly the end of the outlet pipe is below the oil level in the oil tank, which means that both the inlet container and the oil tank function as air locks. Thus, the oil will flow freely through the deaeration system when a sufficient negative pressure prevails in the separating container. The oil flow rate is mainly determined by the height difference between the oil levels in the inlet container and in the oil tank. The flow rate of the oil can also be adjusted by adjusting the negative pressure in the separating container and the check valve in the rising pipe.

The removal of air in the deaerator takes place in the rising pipe, in the separating container under negative pressure and in the outlet pipe. In the rising pipe, air bubbles having normal air pressure, i.e. air bubbles formed under ambient air pressure, get into a space under a lower pressure and therefore their volume increases in proportion to the reduction of pressure. The increase in volume results in an increased buoyancy of the air bubbles, which again produces an increased rate of rise of the air bubbles in the oil. In the separating container, the negative pressure causes a slowing down of the movement of the air bubbles with the oil flowing into the outlet pipe, and so most of the air bubbles can rise to the surface and be separated from the oil in the separating container. Since the outlet pipe is also substantially vertical and the oil flow is relatively smooth, additional separation of air occurs even in the outlet pipe, because in this pipe, too, the air bubbles tend to move up toward the separating container in spite of the oil flowing in the opposite direction.

The deaerator of the invention has significant advantages as compared with prior art. The deaerator is very simple and reliable in operation and it can be placed in any free oil flow. The deaerator removes most of the air bubbles in the oil flow, so that the oil flowing into the main oil tank of the oil circulating lubrication system is very clean. Thus, the amount of circulating lubrication oil, i.e. the volume of the oil tank can be substantially reduced, the intervals between oil changes can be significantly extended and in addition the lubricating effect of the lubrication system is clearly improved, which also allows higher operating speeds of e.g. paper machines.

BRIEF DESCRIPTION OF THE DRAWINGS

In the following, the invention is described in detail by the aid of the attached drawing, which is a diagram representing a deaerator as provided by the invention.

DETAILED DESCRIPTION OF THE INVENTION

The deaerator of the invention is placed in an oil circulating lubrication system comprising an oil tank 1, from where the oil flows through a pump 11, a filter 12 and a pipe 13 to oiling points 15, from which it returns via a return pipe 3. The deaerator is disposed between the return pipe 3 and the oil tank 1 as follows.

From the return pipe 3, the oil flows freely into an inlet container 2, in which the end of the return pipe is below the oil level. The oil level in the inlet container is clearly higher than the oil level in the oil tank 1, the difference $\Delta h$ between the oil levels in these two containers being a significant factor affecting the velocity of the oil flow through the deaerator. From the lower part of the inlet container, a connecting pipe 10 leads into the upper part of the oil tank 1, i.e. into the air space of the oil tank. Connected to the air spaces in the upper parts of both the oil tank 1 and the inlet container 2 are breathers 14.

From the oil space of the inlet container 2, i.e. from a level clearly below the oil surface, a substantially vertical rising pipe 5 leads through a check valve 8 into the air space of in the upper part of a separating container 4 placed substantially above the inlet container 2. The upper part of the separating container is provided with a suction connection 7 for the application of suction to create a negative pressure in the air space of the separating container, and its lower part is provided with a discharge connection 9 for the removal of impurities gathered on the bottom of the separating container. A substantially vertical outlet pipe 6 starting from the lower end of the separating container 4, from a point close to its bottom, passes the oil into the oil tank 1, delivering the oil at a level below the surface of the oil in the tank.

The deaerator presented in the drawing works as follows. The oil flowing in the return pipe 3 enters into the inlet container 2, where there already occurs some degree of separation as that portion of the oil that is not passed up into the separating container, which is also the cleanest portion of the oil, can flow directly via the connecting pipe 10 into the oil tank 1. Most of the oil, in practice 80–95% of the oil flow, rises up via the rising pipe 5 into the separating container 4, mainly due to the difference $\Delta h$ between the oil levels and to the negative pressure in the separating container 4. Any air bubbles in the oil move vigorously upward in the rising pipe 5, and most of them remain on the oil surface in the separating container and dissolve there. Thus, clean oil can flow down through the outlet pipe 6 into the oil tank 1.

The invention has been described above via an example by the aid of the attached drawing while different embodiments of the invention are possible within the framework of the inventive idea defined by the claims.

What is claimed is:

1. A deaerator for the treatment of oil returning from an oil circulating lubrication system before the oil returns into an oil tank (1), characterized in that the deaerator comprises:

an inlet container (2) acting as an air lock, in which the oil level is higher than the oil level in the oil tank (1) and into which the oil to be purified flows via a return pipe (3);

a separating container (4) placed above the inlet container, with a rising pipe (5) leading from the inlet container into the separating container;

an outlet pipe (6) for passing the oil from the separating container (4) into the oil tank (1); and a suction connection (7) in the upper part of the separating container (4) for the application of negative pressure in the separating container and for the removal of the separated air from the separating container.

2. The deaerator as defined in claim 1, wherein the rising pipe (5) is provided with an adjustable check valve (8) for the adjustment of the oil flow rate in the rising pipe.

3. The deaerator as defined in claim 1, wherein the lower part of the separating container (4) is provided with a discharge connection (9) for the removal of impurities gathered on the bottom of the separating container.

4. The deaerator as defined in claim 1, further comprising a connecting pipe (10) connected to the lower part of the inlet container (2) to pass the cleanest oil gathered in the lower part of the inlet container directly into the oil tank.

5. The deaerator as defined in claim 4, wherein the connecting pipe (10) is provided with a valve.

6. The deaerator as defined in claim 1, wherein the end of the return pipe (3) and the end of the rising pipe (5) in the inlet container (2) are at a level below the oil surface.

7. The deaerator as defined in claim 1, wherein the end of the outlet pipe (6) in the oil tank (1) is at a level below the oil surface.

8. The deaerator as defined in claim 1 wherein the oil flow through the separating container (4) is controlled by adjusting the height difference ($\Delta h$) between the oil levels in the oil tank (1) and inlet container (2).

9. The deaerator as defined in claim 1 wherein the oil flow through the separating container (4) is controlled by adjusting the negative pressure in the separating container.

10. The deaerator as defined in claim 2 wherein the oil flow through the separating container (4) is controlled by adjusting the check valve (8).

* * * * *